United States Patent

[11] 3,627,762

[72] Inventors Luigi Bernardi;
Severina Coda; Giselbert Karl Suchowsky;
Lorenzo Pegrassi, all of Milan, Italy
[21] Appl. No. 725,513
[22] Filed Apr. 30, 1968
[45] Patented Dec. 14, 1971
[73] Assignee Societa Farmaceutici Italia
Milan, Italy
[32] Priority July 25, 1967
[33] Italy
[31] 18753 A/67

[54] 1,3-BENZOXAZINE-2-THIONES
4 Claims, No Drawings
[52] U.S. Cl. .................................................. 260/244 R,
260/471 A, 260/519, 424/248
[51] Int. Cl. ............................................... C07d 87/14
[50] Field of Search ........................................... 260/244

[56] References Cited
UNITED STATES PATENTS
2,326,732  8/1943  Fisher............................. 260/244
3,427,313  2/1969  Bernardi et al. ............... 260/244
3,446,804  5/1969  Shavel et al.................... 260/244
FOREIGN PATENTS
1,003,113  9/1965  Great Britain................. 260/244

OTHER REFERENCES

Chemical Abstracts Subject Index, A– J, Vol. 70, pages 488 S– 489 S (1969). QD1.A51
Chemical Abstracts Seventh Collective Index Subjects Hy–Lit Volumes 56–65, page 11,576 S (1970). QD1.A51
Chemical Abstracts Subject Index, A– K, Vol. 69, page 479 S (July– December, 1968,– 1969). QD1.A51
Burger Medicinal Chemistry, 2nd ed., N.Y., pages 77–78, Interscience, 1968 RS403.B8

Buzas et al. I Compt. Rend Vol. 252, pages 896–898 (1961). Q46.A14
Buzas et al. II Chem. Abst. Vol. 55, Column 15407 (1961) QD1.A51
Chylinska et al. J. Med. Chem. Vol. 6, pages 484–487 (1963) RS1.J5
Lindemann et al. Chem. Abst. Vol. 22, page 3664 (1928) QD1.A51
Netherlands Application 6,615,207 3–1967 (3–28–67) page 5
Noller Chemistry of Organic Compounds, 2nd ed., page 170, Philadelphia, Saunders, 1958 QD253.N65
Takahashi et al. German Application 1,147,583 4–1963 (KL 12p 3) (2 pages spec)

*Primary Examiner*—Natalie Trousof
*Attorneys*—Curt M. Avery, Arthur E. Wilfond, Herbert L. Lerner and Daniel J. Tick ABSTRACT: Described are 1,3-benzoxazine-2-thiones of the formula

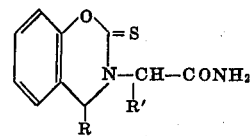

wherein R and R' are selected from the group consisting of hydrogen, methyl and ethyl. The following compounds come within the above formula: 3,4-dihydro-2-thioxo-2H-1,3-benzoxazine-3-acetamide; 3,4-dihydro-α-methyl-2-thioxo-2H-1,3-benzoxazine-3-acetamide; 3,4-dihydro-4-methyl-2-thioxo-2H-1,3-benzoxazines-3-acetamide. Also described is a process for preparing the compounds which display antidepressant properties.

1,3-BENZOXAZINE-2-THIONES

Our present invention relates to 1,3-benzoxazine-2-thiones and the process for the preparation thereof. In particular our invention has an object 1,3-benzoxazine-2-thiones of the structure

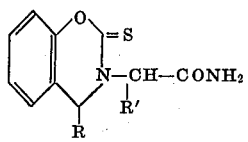

wherein R and R' are selected from the group consisting of hydrogen, methyl and ethyl; and the process for their preparation. The compounds of our invention display interesting pharmacological activities and may be usefully employed as antidepressants.

Our process for the preparation of the new 1,3-benzoxazine-2-thiones consists in reacting a lower alkyl ester of o-hydroxy-phenyl-alkylamino-alkylcarboxylic acid with a suitable sulphurated compound to give the optionally-4-substituted 3-carboalkoxy-alkyl-,3-benzoxazin-2-thione which is saponified to the free acid and then transformed into the corresponding amide according to the following reaction scheme

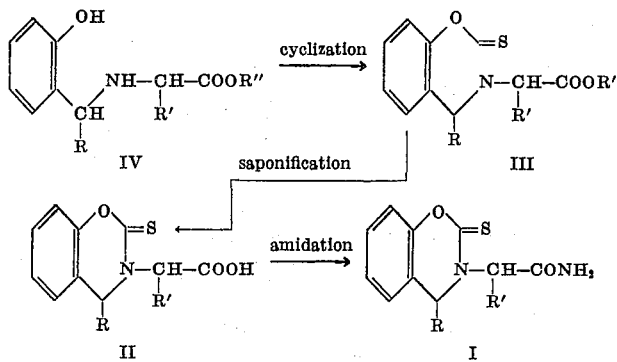

wherein R and R' are selected from the group consisting of hydrogen, methyl and ethyl, and R'' is alkyl having from one to four carbon atoms.

More particularly, the alkyl ester IV dissolved in a solvent such as tetrahydrofurane, benzene or diethyl ether is made to react with a suitable sulphurated agent such as thiophosgene, carbon disulphide or carbonylthiodiimidazole in the presence of a condensing agent such as pyridine triethylamine or diethylamine. The cyclized compound III after being purified and crystallized is dissolved in a solvent, such as an aliphatic alcohol having from one to four carbon atoms, saponified with alkali and then dissolved in a suitable solvent. To the solution an excess of ammonia in the presence of dicyclohexylcarbodiimide optionally together with N-hydroxy-succinimide is added. The amide I separates by crystallization as a crystalline solid stable to light and heat.

The compounds of the invention show an interesting activity in preventing the depression induced by reserpine. In particular, tests have been performed using the 3,4-dihydro-2-thioxo-2H-1,3-benzoxazine-3-acetamide which confirm its effectiveness in preventing the blepharoptosis induced by reserpine and in normalizing the hypothermia. Such a compound induces in mice, when administered at high doses (300–1,000 mg./kg. per os) a clinical pattern of sedation which however disappears within 4–5 hours.

Table 1 lists the data of the antidepressive activity of 3,4-dihydro-2-thioxo-2H-1,3-benzoxazine-3-acetamide in mice with respect to reserpine. This activity is also compared to the antidepressive activity shown by imipramine with respect to reserpine.

TABLE 1

| Compound | Doses, mg./kg. | Administration route | Ptosis | Rectal temperature, in °C. |
|---|---|---|---|---|
| Controls | | | 0 | 37.9 |
| Reserpine (R) | 3.0 | Intraperitoneal | 40 | 32.1 |
| Imipramine plus R | 50.0 | do | 29 | 36.2 |
| 3,4-dihydro-2-thioxo-2H-1,3-benzoxazine-3-acetamide plus R. | 50.0 | do | 25 | 36.5 |
| 3,4-dihydro-2-thioxo-2H-1,3-benzoxazine-3-acetamide plus R. | 100.0 | do | 5 | 37.5 |

Examination of the data in table 1 shows that the compound of the invention, at the same dosage of 50 mg./kg. is as active as imipramine. However, the dose of 50 mg./kg. intraperitoneal is the highest tolerated dose for imipramine, whereas 3,4-dihydro-2-thioxo-2H-1,3-benzoxazine-3-acetamide is tolerated to dose of 300 mg./kg. intraperitoneal. Normalization of reserpinized animals is already observed at a dose of 100 mg./kg.

The antireserpine action has been also tested on a macaco rhesus monkey (weight 3.100 kg). The animal was injected with 3,4-dihydro-2-thioxo-2H-benzoxazine-3-acetamide at a dose of 25 mg./kg. intramuscular and, 3 hours after the treatment, was injected with 0.75 mg./kg. of reserpine intramuscular. It has been observed that the reserpine syndrome was completely antagonized by the compound of the invention.

The anti-amin-oxidase (anti-MAO) activity has been studied in vivo and in vitro on hepatic and cerebral mitochondria of rats. Inhibiting concentration $50(IC_{50})$ in vitro is the molar concentration of the substance able to reduce 50 percent of the mitochondrial monoaminoxidase activity. Inhibiting dose $50(ID_{50})$ in vivo is the quantity of the substance able to reduce 50 percent of the mitochondrial monoaminoxidase activity. The data obtained are reported in table 2.

TABLE 2

| Organ | Inhibiting compound | In vitro $IC_{50}$, mol | In vivo $ID_{50}$, mg./kg./os |
|---|---|---|---|
| Liver | Iproniazide | $1.5 \times 10^{-5}$ | 1.35 |
| | 3,4-dihydro-2-thioxo-2H-1,3-benzoxazine-3-acetamide. | $5 \times 10^{-5}$ | [1] 200 |
| Brain | Iproniazide | $1.2 \times 10^{-5}$ | 8.06 |
| | 3,4-dihydro-2-thioxo-2H-1,3-benzoxazine-3-acetamide. | $2 \times 10^{-4}$ | [1] 200 |

[1] Inactive.

From the above data it can be deduced that 3,4-dihydro-2-thioxo-2H-1,3-benzoxazine-3-acetamide shows in vitro a certain antimonoaminoxidase activity. This activity could be explained by a direct action of the product on mitochondria. In vivo this activity is absent.

The acute toxicity ($LD_{50}$) of 3,4-dihydro-2-thioxo-2H-1,3-benzoxazine-3-acetamide determined on albino male mice (weight about 20 g.) by oral route has been determined 48 hours after administration of the compound. This datum was at least 5 times lower than the toxicity of imipramine as shown by the data in table 3.

TABLE 3

| Compound | $DL_{50}$ mg./kg. per os |
|---|---|
| Imipramine | 487.5 |
| 3,4-dihydro-2-thioxo-2H-1,3-benzoxazine-3-acetamide | 2000.0 |

The antidepressive effect of 3,4-dihydro-2-thioxo-2H-1,3-benzoxazine-3-acetamide in respect to reserpine has furthermore been studied for observing the normalization of behavior which the administration of this compound causes in a swimming reserpinized rat. The experiment consists in putting the animal into a basin full of water and measuring the time taken by the rat to swim to the edge of and to leave the basin. A nontreated rat generally takes 7–8 seconds to overcome this test. The reserpinized rat swims irregularly. This swimming consists in movements which allow the animal to remain afloat only. In those cases in which the animal is successful to safely exit, the time spent is much higher. Table 4 reports the data obtained from this experiment. The test has been carried out 5 hours after the administration of the compounds under examination.

TABLE 4

| Compound | Dose, mg./kg., intraperitoneal | Average time to get out of the basin (in seconds) | Number of animals which do not get out |
|---|---|---|---|
| Controls | | 7 | 0/5 |
| Reserpine (R) | 5 | 35 | 1/5 |
| Imipramine plus R | 25 | 7 | 0/5 |
| 3,4-dihydro-2-thioxo-2H-1,3-benzoxazine-3-acetamide plus R | 25 | 7 | 0/5 |

The following examples serve to illustrate the invention without limiting it.

EXAMPLE 1

3,4-dihydro-2-thioxo-2H-1,3-benzoxazine-3-acetamide

A solution of 5.9 cc. of thiophosgene in 20 cc. of tetrahydrofurane is added to 10 g. of ethyl o-hydroxybenzyl-amino-acetate dissolved in 60 cc. of tetrahydrofurane. After half an hour the solvent is evaporated off almost to dryness. 21.5 cc. of triethylamine diluted with an equal volume of tetrahydrofurane are added to the residue. This mixture is kept for half an hour under stirring, evaporated, the residue taken up with water and the oily phase extracted with chloroform. The residue of the extraction is purified by chromatography of alumina. Five grams of ethyl 3,4-dihydro-2-thioxo-2H-1,3-benzoxazine-3-acetate as white crystals, melting at 67°–70° C., are obtained. Five grams of this compound are dissolved in 100 cc. ethyl alcohol and saponified at room temperature with 20 cc. of N-sodium hydroxide. The ethyl alcohol is evaporated and the aqueous solution acidified to give 3.7 g. of 3,4-dihydro-2-thioxo-2H-1,3-benzoxazine-3-acetic acid melting at 171°–173° C. Three grams of this acid are dissolved in the smallest amount of tetrahydrofurane. An equivalent of an alcoholic solution of ammonia is then added, whereby the ammonium salt of 3,4-dihydro-2-thioxo-2H-1,3-benzoxazine-3-acetic acid precipitates. It is first dried, then dissolved in 65 cc. of dimethylformamide at 50°–60° C. A half equivalent of an alcoholic solution of ammonia, 3 g. of N-hydroxy-succinimide and 2.85 g. of dicyclohexylcarbodiimide are added to the cooled solution. The mixture is stirred for a few hours, the precipitated dicyclohexylurea filtered off and the filtrate evaporated to dryness. The residue is taken up with ethyl alcohol/diethyl ether whereby 2 g. of 3,4-dihydro-2-thioxo-2H-1,3-benzoxazine-3-acetamide as very thin white crystals, melting at 232°–235° C., are obtained.

EXAMPLE 2

3,4-dihydro-α-methyl-2-thioxo-2H-1,3-benzoxazine-3-acetamide

The operation is carried out as described in example 1 with the difference that the starting material consists of ethyl 3,4-dihydro-α-methyl-2-thioxo-2H-1,3-benzoxazine-3-acetate from which by cyclization 4H-3(1'-carboethoxyethyl)-1,3-benzoxazin-2-thione is formed. By successive saponification and amidation 3,4-dihydro-α-methyl-2-thioxo-2H-1,3-benzoxazine-3-acetamide is obtained.

EXAMPLE 3

3,4-dihydro-4-methyl-2-thioxo-2H-1,3-benzoxazine-3-acetamide

The operation is carried out as described in example 1 with the difference that the starting material consists of ethyl 3,4-dihydro-4-methyl-2-thioxo-2H-1,3-benzoxazine-3acetate from which by cyclization 4-methyl-3-carboethoxymethyl-1,3-benzoxazin-2-thione is formed. By successive saponification and amidation 3,4-dihydro-4-methyl-2-thioxo-2H-1,3-benzoxazine-3-acetamide is obtained.

We claim:

1. A compound of the formula

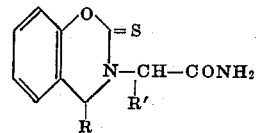

wherein R and R' are selected from the group consisting of hydrogen, methyl and ethyl.

2. The compound of claim 1, which is 3,4-dihydro-2-thioxo-2H-1,3-benzoxazine-3-acetamide.

3. The compound of claim 1, which is 3,4-dihydro-α-methyl-2-thioxo-2H-1,3-benzoxazine-3-acetamide.

4. The compound of claim 1, which is 3,4-dihydro-4-methyl-2-thioxo-2H-1,3-benzoxazine-3-acetamide.

* * * * *